(12) United States Patent
Kienzner et al.

(10) Patent No.: US 10,272,871 B2
(45) Date of Patent: Apr. 30, 2019

(54) AIRBAG MODULE, DIFFUSER FOR AN AIR BAG MODULE AND SAFETY SYSTEM FOR VEHICLE PASSENGERS

(71) Applicant: TRW Automotive Safety Systems GmbH, Aschaffenburg (DE)

(72) Inventors: Andreas Kienzner, Wiesen (DE); Matthias Helmstetter, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 31 days.

(21) Appl. No.: 15/520,122

(22) PCT Filed: Oct. 9, 2015

(86) PCT No.: PCT/EP2015/001990
§ 371 (c)(1),
(2) Date: Apr. 19, 2017

(87) PCT Pub. No.: WO2016/062378
PCT Pub. Date: Apr. 28, 2016

(65) Prior Publication Data
US 2017/0369021 A1    Dec. 28, 2017

(30) Foreign Application Priority Data

Oct. 23, 2014    (DE) .................... 20 2014 008 432 U

(51) Int. Cl.
*B60R 21/26*    (2011.01)
*B60R 21/203*    (2006.01)
(Continued)

(52) U.S. Cl.
CPC ........ *B60R 21/217* (2013.01); *B60R 21/2037* (2013.01); *B60R 21/26* (2013.01);
(Continued)

(58) Field of Classification Search
CPC ... B60R 21/2037; B60R 21/26; B60R 21/261; B60R 2021/2173; B60R 2021/2725
See application file for complete search history.

(56) References Cited

U.S. PATENT DOCUMENTS 5,826,901 A  * 10/1998  Adomeit ................. B60R 21/05
                                                      280/728.2
6,361,065 B1 *  3/2002  Frisch ................. B60R 21/2037
                                                      280/728.2
(Continued)

FOREIGN PATENT DOCUMENTS

DE       202005020680       6/2006
DE       102008060135       6/2010
(Continued)

*Primary Examiner* — Drew J Brown
(74) *Attorney, Agent, or Firm* — Tarolli, Sundheim, Covell & Tummino LLP

(57) ABSTRACT

The invention relates to an airbag module for a safety system for vehicle passengers, comprising an airbag, a gas generator (23) and a diffuser (10) with a dome section (11) and at least one retaining section which maintains the airbag in a compressed manner. Said retaining section comprises at least one securing opening in which at least one securing device, in particular a securing bolt, is received. Said securing opening (13) is arranged below the dome section (11).

19 Claims, 6 Drawing Sheets

(51) Int. Cl.
  *B60R 21/217* (2011.01)
  *B60R 21/261* (2011.01)
  *B60R 21/272* (2006.01)

(52) U.S. Cl.
  CPC .......... *B60R 21/261* (2013.01); *B60R 21/272* (2013.01); *B60R 2021/2173* (2013.01); *B60R 2021/2725* (2013.01)

(56) References Cited

U.S. PATENT DOCUMENTS

| | | | |
|---|---|---|---|
| 6,435,540 B1 | 8/2002 | Durre | |
| 6,439,599 B1 * | 8/2002 | Laue | B60R 21/2037 280/728.2 |
| 6,592,141 B1 | 7/2003 | Dancasius et al. | |
| 6,712,383 B2 * | 3/2004 | Asic | B60R 21/2037 280/728.2 |
| 7,350,800 B2 * | 4/2008 | Boyd | B60R 21/217 280/728.2 |
| 7,374,199 B2 * | 5/2008 | Boyd | B60R 21/217 280/728.2 |
| 7,823,920 B1 * | 11/2010 | Burghardt | B60R 21/261 280/731 |
| 2001/0048216 A1 | 12/2001 | Varcus et al. | |
| 2003/0214119 A1 | 11/2003 | Grossmann et al. | |
| 2009/0218739 A1 * | 9/2009 | Terada | B60R 21/2037 267/2 |
| 2013/0221641 A1 * | 8/2013 | Kondo | B60R 21/2037 280/731 |
| 2013/0241181 A1 | 9/2013 | Faeth et al. | |

FOREIGN PATENT DOCUMENTS

| | | |
|---|---|---|
| DE | 102009006077 | 7/2010 |
| DE | 102009013802 | 9/2010 |

* cited by examiner

AIRBAG MODULE, DIFFUSER FOR AN AIR BAG MODULE AND SAFETY SYSTEM FOR VEHICLE PASSENGERS

RELATED APPLICATIONS

This application corresponds to PCT/EP2015/001990 filed Oct. 9, 2015, which claims the benefit of German Application No. 20 2014 008 432.7 filed Oct. 23, 2014, the subject matter of which are incorporated herein by reference in their entirety.

BACKGROUND OF THE INVENTION

The invention relates to an airbag module for a safety system for vehicle passengers, comprising an airbag, a gas generator and a diffuser including a dome section as well as a retaining section which maintains the airbag in a compressed manner, wherein the retaining section comprises securing openings in which securing devices, in particular securing bolts, are received. Apart from that, the invention relates to a diffuser for an airbag module as well as to a safety system for vehicle passengers.

From DE 10 2012 004 866 A1 an airbag module for a vehicle steering wheel comprising a gas generator and a diffuser is known. The diffuser is hat-shaped and includes an inversely cup-shaped outer wall the downwardly open end of which is configured to have a flange-type expansion in the type of a hat brim. Openings in the hat brim, which are evident in FIG. 4 of DE 10 2012 004 866 A1, serve for receiving securing bolts so that an airbag can be maintained in a compressed manner by the hat brim (or the securing flange, respectively). The airbag module according to this prior art, on the one hand, has a comparatively simple construction; on the other hand, the adaptation thereof to the specific requirements of a vehicle occupant restraint system is considered to be in need of improvement. Especially, the airbag module according to prior art requires a comparatively large space and is difficult to be adapted to varying conditions.

SUMMARY OF THE INVENTION

It is the object of the present invention to state a further developed airbag module so as to overcome the aforementioned drawbacks. In particular, an airbag module, a diffuser for an airbag module and a vehicle passenger safety system are to be suggested which are adapted better to the basic conditions defined by the application. Preferably the space required is to be reduced and the adaptation to different mounting environments is to be facilitated.

In accordance with the invention, this object is achieved with respect to the diffuser by the subject matter of claim 1, with respect to the airbag module by the subject matter according to claim 10 and with respect to the safety system for vehicle passengers by the subject matter according to claim 16. Advantageous and useful configurations of the airbag module according to the invention, of the diffuser for an airbag module and of the safety system for vehicle passengers are described in the subclaims.

The afore-mentioned object is achieved especially by a diffuser for an airbag module for a vehicle passenger safety system, wherein the airbag module includes an airbag and a gas generator, the diffuser comprising a dome section as well as at least one retaining section which secures the airbag in a compressed manner, wherein the retaining section includes at least one securing device, especially a securing bolt and/or at least one securing opening in which at least one securing device, especially a securing bolt, can be received, wherein the securing opening and/or the securing device is/are arranged below the dome section.

According to a first inventive idea the securing openings are arranged below the dome section. In this way, the diameter of the airbag module is reduced vis-à-vis the prior art (especially DE 10 2012 004 866 A1) in which the retaining bolts and pertinent securing openings are arranged outside the dome section. This allows to better utilize the space available. In total, the diffuser is adapted especially well to the conditions for a safely system for vehicle passengers.

According to a second inventive idea (which may be combined with the first inventive idea), the diffuser has an at least two-part design, wherein a first part forms the dome section and a second part (at least in part) forms the retaining section. In this way, a modular split structure is realized so that, for example, different material combinations adapted to requirements as regards the load and the function of the airbag module can be realized. Further, the special demands, especially demands to design, by car manufacturers can be taken into account. In total, also with this inventive idea a simplified and improved adaptation to the mounting location of the airbag module is realized.

By "dome section" a section of the diffuser is to be understood which is towering and in its interior forms a volume which (at least in part) is adapted to accommodate the gas generator. The dome section thus forms a cage inside of which the gas generator can be arranged and can especially oscillate. The dome section is preferably configured to be inversely cup-shaped and, resp., outwardly bulged. Similarly to DE 10 2012 004 866 A1, the retaining section (in prior art referred to as "flange-type extension 125") is considered to be part of the diffuser, even if the actually air-conducting function is realized by the dome section (analogously to the "inversely cup-shaped outer wall 122" in prior art).

By an arrangement "below" the dome section especially an arrangement in which the securing openings are arranged below the wall of the dome section is to be understood. The securing openings thus (not absolutely) need to be arranged below a volume defined by the dome section but may also be arranged inside the volume defined by the dome section. Especially preferred, the securing openings are arranged below a volume defined by the dome section (i.e. inferior of the dome section), however. In general, "below" or "bottom" refers to an opening rim of the diffuser which (in the mounted state) faces the gas generator and through which the gas generator can be introduced during assembly. When the securing device or, resp., the securing opening is projected onto a plane defined by the opening rim, the securing means or, resp., the securing opening is located inside the surface defined by the opening rim. The securing openings are preferably oval and/or elliptic and/or round and/or angled (e.g. quadrangular) in cross-section. The dome section and the retaining section can be formed by a monolithic body. Alternatively, the dome section and the retaining section may be formed by separate parts which may contact each other, however.

By a two-part design of the diffuser especially a configuration in which the first part is separated from the second part by the material and/or the structure is to be understood. Preferably the first and second parts are at least in portions in contact, however. The first part and/or the second part may in turn per se be monolithic bodies, for example each of them may be formed of only one material.

The dome section preferably has at least one opening, further preferred at least two openings, even further preferred a plurality of openings (for example at least five or at least ten openings) through which the gas may flow out of the gas generator so that the airbag can be inflated. The retaining section may include at least two securing openings (and/or securing devices), preferably at least three securing openings (and/or securing devices), even further preferred at least four (or at least six) securing openings (and/or securing devices).

The retaining section preferably has an annular section. In the annular section the securing openings may be arranged. Alternatively or additionally, the annular section may be formed by the second part. In any case, such retaining section and, resp., annular section allows to realize safe retaining of the airbag (without requiring more space).

The diffuser and/or the dome section and/or the retaining section and/or the first part and/or the second part may be made from metal and/or plastic. In a concrete embodiment, the first part is made from a first material which is different from a second material of the second part. For example, different metal alloys can be used for the first and second materials. It is also imaginable that the first material is a metal and the second material is a plastic material (or vice versa). In total, different material combinations may be realized which meet the requirements regarding the load or the function of the airbag module. Further, also specific demands in terms of design of customers can be taken into account. In total the variability is increased.

The first and second parts may be positively and/or adhesively and/or non-positively connected to each other. There may be provided at least one connecting moans so as to connect the first part and the second part to each other. Such connecting means may comprise a screwed connection and/or a crimped connection and/or a clip connection. The connection basically can be realized in most different ways, especially by bending and/or clipping and/or screwing and/or welding and/or gluing and/or clamping (etc.).

In a concrete embodiment the diffuser, especially the first part, has at least one securing tab. The securing tab may be bent in the mounting position. Further, the securing tab may include a seat for a securing device, especially a securing bolt. The second part may have, for connecting the first and second parts, an opening corresponding to the securing tab, especially a slit through which the securing tab can be passed. After the securing tab has been passed through, it can be bent for securing the first and second parts. Such measure can help to realize a connection of the first and second parts in an especially simple manner.

The foregoing object is further achieved by an airbag module comprising a diffuser of the afore-described type. Moreover, the airbag module comprises an airbag and a gas generator.

In the mounted state in a concrete embodiment only the retaining section (or the second part) is in (clamping) contact with the airbag. However, in the mounted state the airbag may also be (loosely) adjacent to the diffuser.

The airbag module may comprise an airbag housing and/or a module cap and/or a generator support. Preferably the airbag is clamped between the retaining section (or second part) and the generator support.

The airbag module may have an absorbing element which especially is ring-shaped at least in portions. The absorbing element may include at least one (e.g. axially extending) damping member, especially an absorbing foot. The retaining section and/or the second part and/or the annular section may have at least one opening for receiving the damping member, especially the absorbing foot. At least one section, especially an annular absorbing element section, of the absorbing element may be arranged between the gas generator and the retaining element and/or between the gas generator and the second part and/or between the gas generator and the annular section.

Such measures will enables the gas generator, in an efficient and constructively simple manner, to be utilized as a vibration damping mass. In particular, a compact and simple solution is suggested for such application.

The retaining section and/or the annular section and/or the second part can be arranged below the gas generator. Especially the gas generator can be arranged between the retaining section and the dome section. This, too, helps to further improve the compact design of the airbag module.

The securing holes may be arranged outside a gas generator circumference (when viewed from above). Preferably, the securing holes are arranged inside the gas generator circumference, however. This, too, helps to further improve the compact arrangement.

The foregoing object is further achieved by a safety system for vehicle passengers comprising a diffuser and, resp., an airbag module of the afore-described type. The foregoing object is further achieved by a steering wheel and/or motor vehicle comprising a diffuser and/or an airbag module and/or a safety system for vehicle passengers of the afore-described type.

The diffuser and, resp., the airbag module and, resp., the vehicle passenger safety system can be adapted to be mounted in a steering wheel or can be mounted in a steering wheel.

Basically, a design of the airbag module can be realized with an absorbing element, wherein the gas generator is supported preferably in an oscillating manner inside the diffuser, or without an absorbing element (wherein the gas generator is arranged to be preferably fixed in the diffuser). The gas generator may be secured directly to the retaining section and/or the annular section and/or the first part or via an absorbing element. Alternatively, the gas generator may be secured to the dome section of the diffuser.

The airbag can be designed in a dimensionally stable manner by means of heat treatment wherein the following sequences of method steps for mounting the airbag module can be realized:

In a first possible arrangement, the generator support can be secured to a module support. The module support is a component of the airbag module which is adapted to be coupled to an airbag module seat, especially to a steering wheel. Such module support is also referred to as "generator support".

In the first arrangement, furthermore an absorbing element may be provided, i.e. a resilient component, by which the gas generator can be supported in an oscillating manner. The absorbing element can be configured generally of silicone with or without any further components (e.g. metal inserts).

The assembly can be carried out in the following order. At first the gas generator is arranged on the absorbing element then the absorbing element is arranged on the module support and then the diffuser is arranged on the module support. An airbag assembly may be carried out in the following order. At first the airbag is folded, then an optional heat treatment is performed, then the airbag is inserted in the module cap, then the diffuser is inserted in the airbag. After that, the module cap and the module support are connected and finally the diffuser is secured to the module support. The airbag assembly may also be carried out in the following alternative sequence. At first the dome section (the first part) is inserted in the airbag, then the airbag is folded, then an optional heat treatment is carried out, then the dome section or, resp., the first part is inserted in the module cap together with the airbag, then the dome section (the first part) is connected to the retaining section (the second part), then the diffuser and the module support are connected to each other. For the optional heat treatment of the airbag it is important that the gas generator is not mounted before the heat treatment. In the case of the absorbing element this might be possible, if it is heat-resistant.

A second possible arrangement differs as to the sequence of assembly of the gas generator, the absorbing element and the diffuser from the first arrangement. At first the absorbing element is mounted to the module support, then the gas generator is mounted on the absorbing element and finally the diffuser is mounted on the module support.

A third possible arrangement differs from the first arrangement in that no absorbing element is provided. The gas generator is first secured to the module support, then the diffuser is secured to the module support. The sequence of the airbag assembly corresponds to that of the first arrangement.

In a fourth arrangement, again an absorbing element is provided. In contrast to the first arrangement, however, the generator support is secured to the dome section (first part). The gas generator is first secured to the absorber, then the absorber is secured to the dome section (first part), then the dome section (the first part) is secured to the retaining section (second part) and finally the diffuser (the dome section and the retaining section or, resp., the first part and the second part) is secured to the module support. The sequence of the airbag assembly may correspond to that of the first arrangement.

In a fifth arrangement, the gas generator is equally (just as in the fourth arrangement) secured to the dome section (or the first part). However, an absorbing element is provided. The assembly can be carried out in the following order. At first the absorbing element is mounted to the dome section or the first part, then the gas generator is mounted to the absorbing element, after that the dome section or the first part is mounted to the retaining section or the second part, and finally the diffuser (comprising the dome section and the retaining section or, resp., the first part and the second part) is mounted to the module support. The airbag assembly may be carried out corresponding to the first arrangement.

In a sixth arrangement, the gas generator may be secured to the retaining section or the second part. An absorbing element is provided. The assembly may be carried out in the following order. At first the gas generator is secured to the absorbing element then the absorbing element is secured to the retaining section or, resp., the second part, then the dome section or the first part is secured to the retaining section or the second part, then the diffuser (comprising the dome section and the retaining section or, resp., the first part and the second part) is secured to the module support. The airbag assembly may be carried out corresponding to the first arrangement.

A seventh arrangement differs from the sixth arrangement by the order of assembly which may be carried out as follows. At first the absorbing element is secured to the retaining section or the second part, then the gas generator is secured to the absorbing element, then the dome section or the first part is secured to the retaining section or the second part and finally the diffuser (comprising the dome section and the retaining section or, resp., the first part and the second part) is secured to the module support. The airbag assembly may be carried out just as in the first arrangement.

An eighth arrangement differs from the seventh arrangement by the fact that no absorbing element is provided. The mounting step for securing the absorber to the retaining section or, resp., the second part is thus omitted. Otherwise the assembly is carried out just as in the seventh arrangement. The airbag assembly, too, may be carried out corresponding to the seventh and, resp., first arrangement.

BRIEF DESCRIPTION OF THE DRAWINGS

Hereinafter the invention shall be illustrated in detail by way of embodiments with reference to the enclosed schematic figures, wherein.

DESCRIPTION

Figure 1:
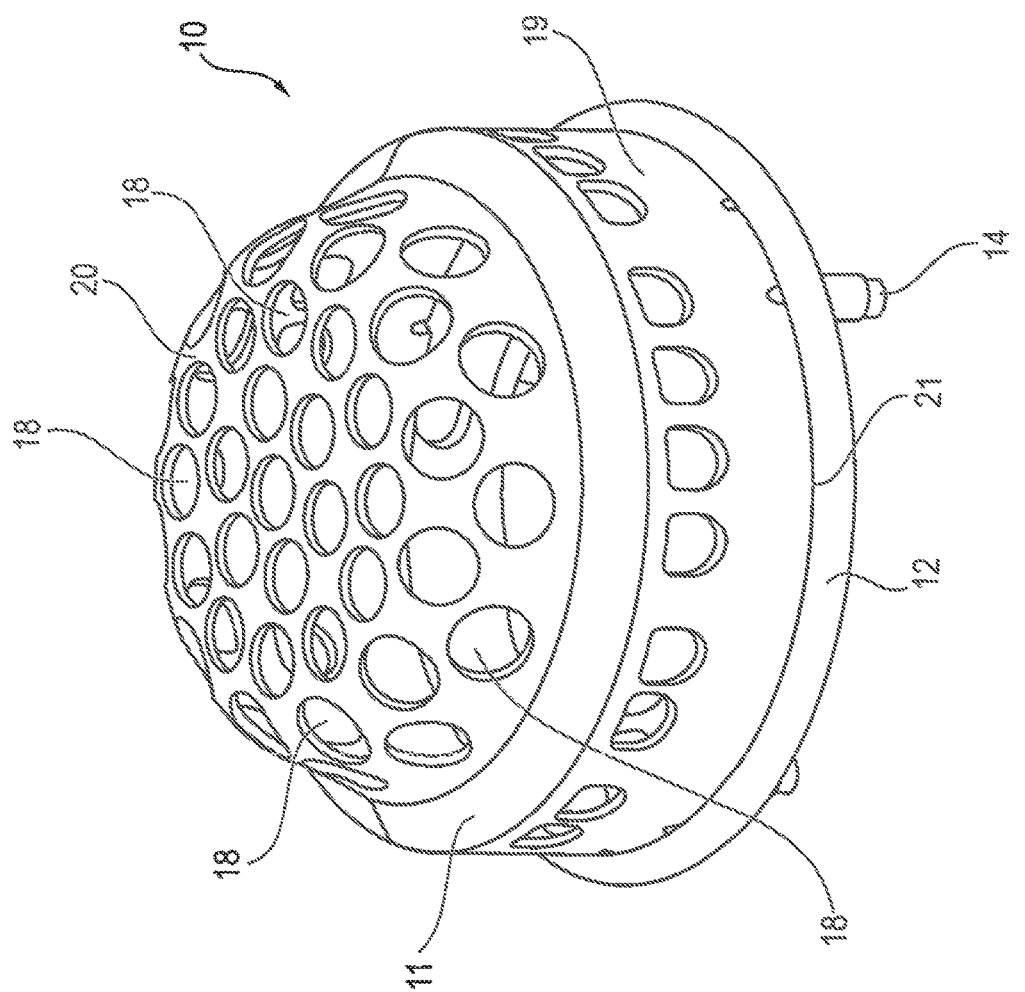
FIG. 1: shows a first embodiment of the diffuser according to the invention in a first schematic oblique view.

Hereinafter like reference numerals will be used for like and equally acting parts.

FIG. 1 shows a diffuser 10 comprising a first part 11 as well as a second part 12. In securing openings 13 (of FIG. 3) securing bolts 14 are arranged. Concretely, three securing bolts 14 are provided, but also a different number of securing bolts may be provided.

Figure 2:
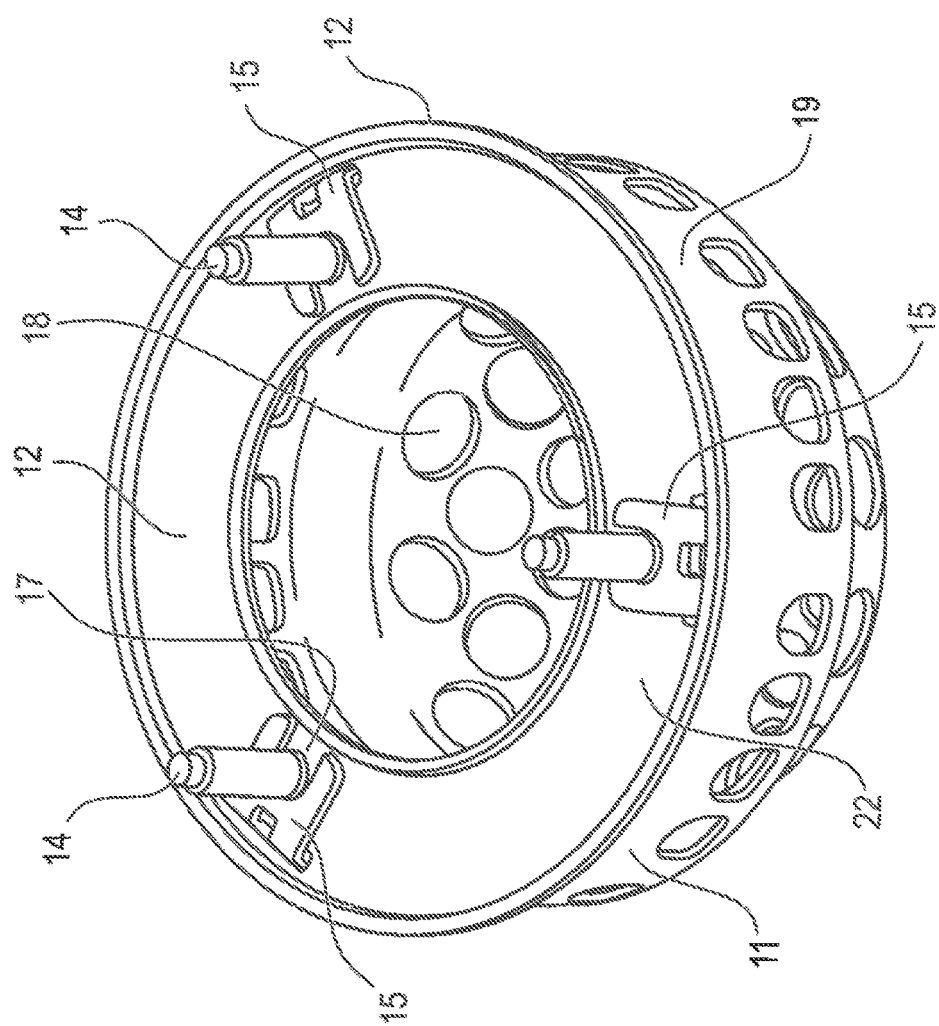
FIG. 2: shows the diffuser according to FIG. 1 in a second oblique view.

The first part 11 includes (three) tabs 15 (cf. FIGS. 2 and 3) which in the mounted state penetrate slits 16 (cf. FIG. 3) and are bent for securing the first and second parts to each other (cf. FIG. 2).

The tabs 15 and slits 16, resp., are arranged to face the securing bolts 14 in a radial direction and include seats 17 in which the securing bolts 14 can be received. In this way, an additional securing of the parts 11, 12 is achieved in a simple manner.

The first part 11 at the same time forms a dome section 11 and acts as a diffuser. For this purpose, plural flow orifices 18 are provided through which the gas for inflating an airbag (not shown) can flow. The dome section 11 is domed and has a cylindrical section 19 as well as a tapering section 20 adjacent to the cylindrical section 19. Both in the cylindrical section 19 and in the tapering section 20 flow orifices 18 are provided. The flow orifices in the concrete case have either a circular cross-section (in the cylindrical section 19) or a semi-elliptic cross-section (in the tapering section 20). The cross-sections may also have different geometries, however.

The second pad 12 is arranged below a rim 21 of the first part. Furthermore, the second part has an annular shape. An underside 22 (cf. FIG. 2) of the second part 12 clamps the airbag (not shown) (e.g. by interaction with the module support which is not shown either) so that the airbag is retained. Inside the diffuser 10 a gas generator (not shown) may be arranged.

The securing bolts 14 serve for mounting the diffuser 10 as well as for manufacturing the clamping connection between the underside 22 and an adjacent counter-piece, especially a module support.

Figure 3:
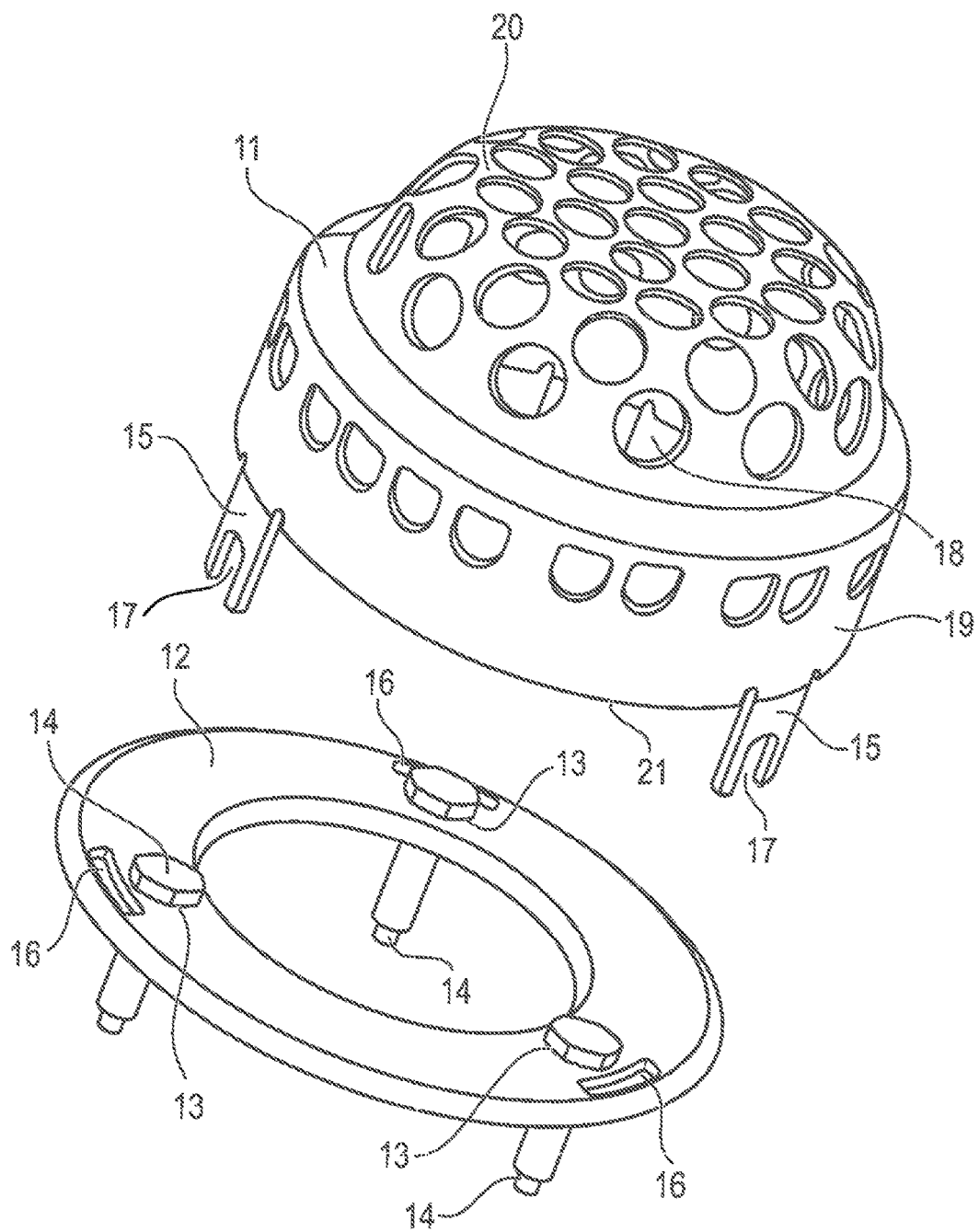
FIG. 3: shows the diffuser according to FIGS. 1 and 2 in an exploded view.
Figure 4:
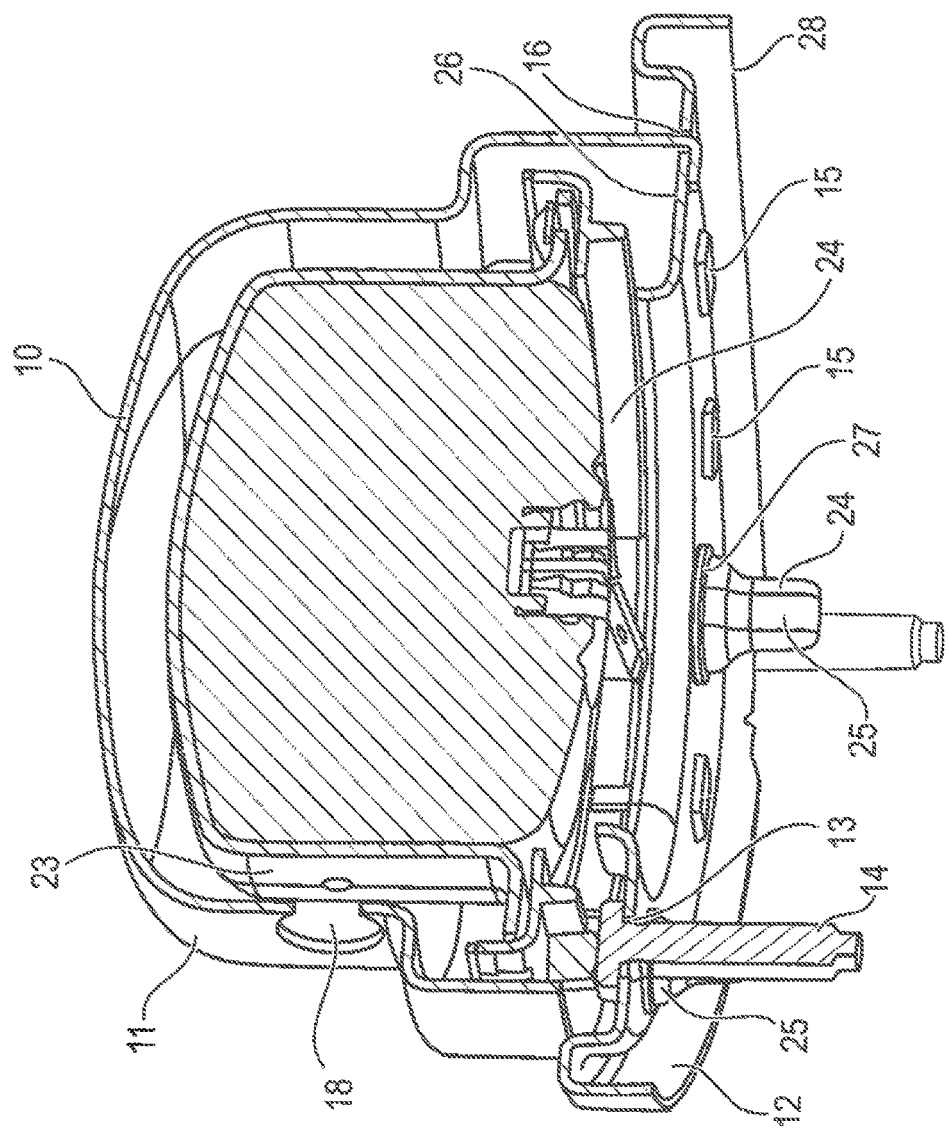
FIG. 4: shows components of an embodiment of the airbag module in a schematic, partly cut oblique view.

FIG. 4 shows components of an airbag module according to an embodiment of the invention, wherein especially the first part 11 differs from the first part 11 according to FIGS. 1-3. Furthermore, in FIG. 4 a gas generator 23 is evident which is arranged inside the diffuser 10. Between the gas generator 23 and the second part 12 moreover an absorbing element 24 including absorbing feet 25 is provided so that the gas generator 23 is supported in an oscillating manner. The absorbing feet 25 are received in a generator support or module support (not shown). Further, also in FIG. 4 tabs 15 serving for connecting the first part 11 and the second part 12 (together with silts not visible in detail) are indicated.

A cross-section of the second part 12 according to FIG. 4 is S-shaped. In an (annular) recess 26 the securing openings 13 are provided.

Moreover, the second part 12 comprises openings 27 (equally in the annular recess 26) for receiving the absorbing feet 25. The slits 16 are also arranged in the (annular) recess 26.

Furthermore, the recess 26 is raised vis-à-vis a (lower) rim 28 of the second part 12 so that a bearing surface (clamping surface) is defined by the rim 28. Between the rim 28 and a facing part (especially the module support) the airbag (not shown) is maintained in a compressed manner.

In the embodiment according to FIG. 4 (just as in the embodiment according to FIGS. 1-3), the securing openings 13 as well as the securing bolts 14 are arranged below the first part 11 and, resp., the dome section 11.

Figure 5:
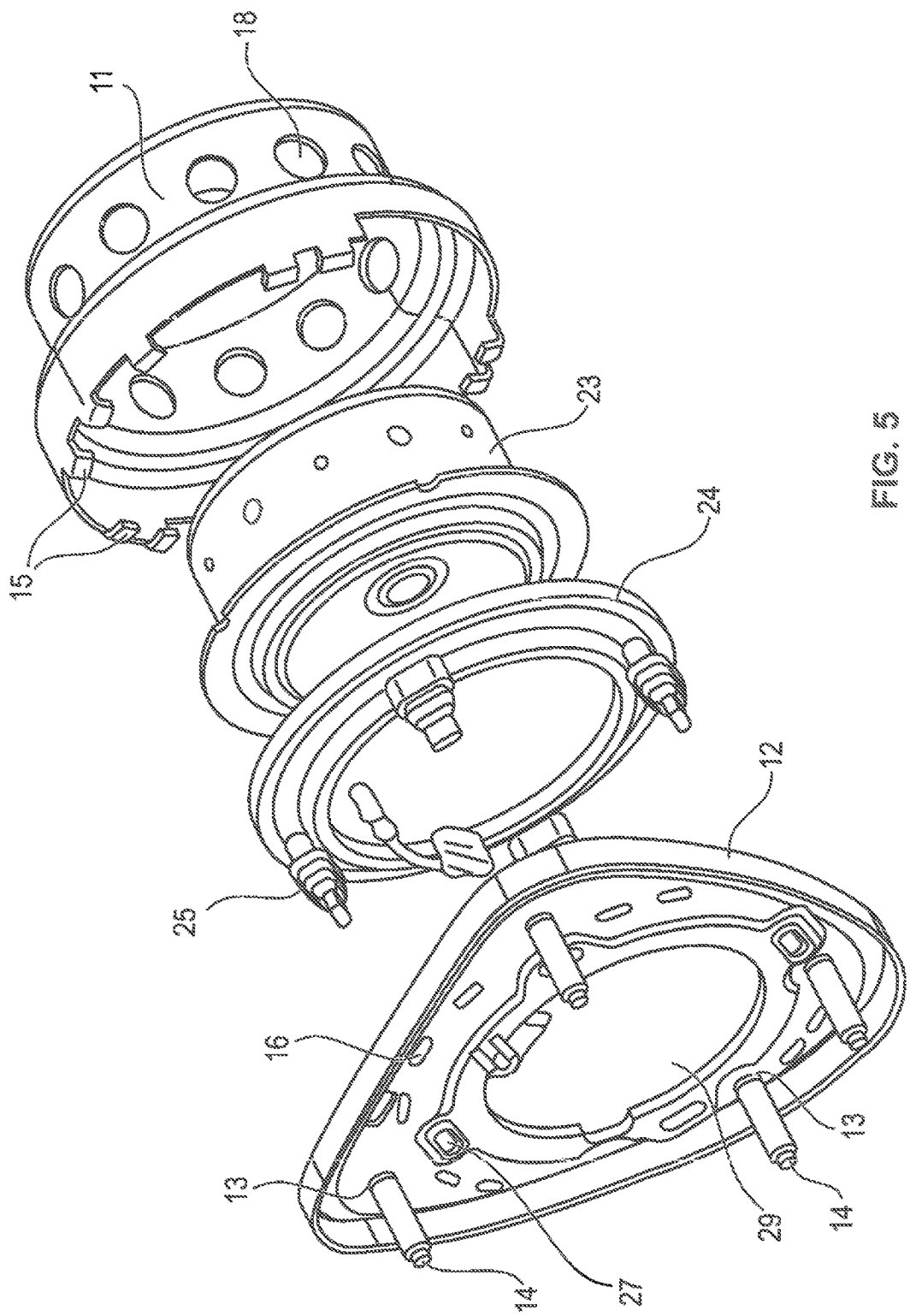
FIG. 5: shows components of an embodiment of the airbag module according to the invention in a first schematic exploded view.
Figure 6:
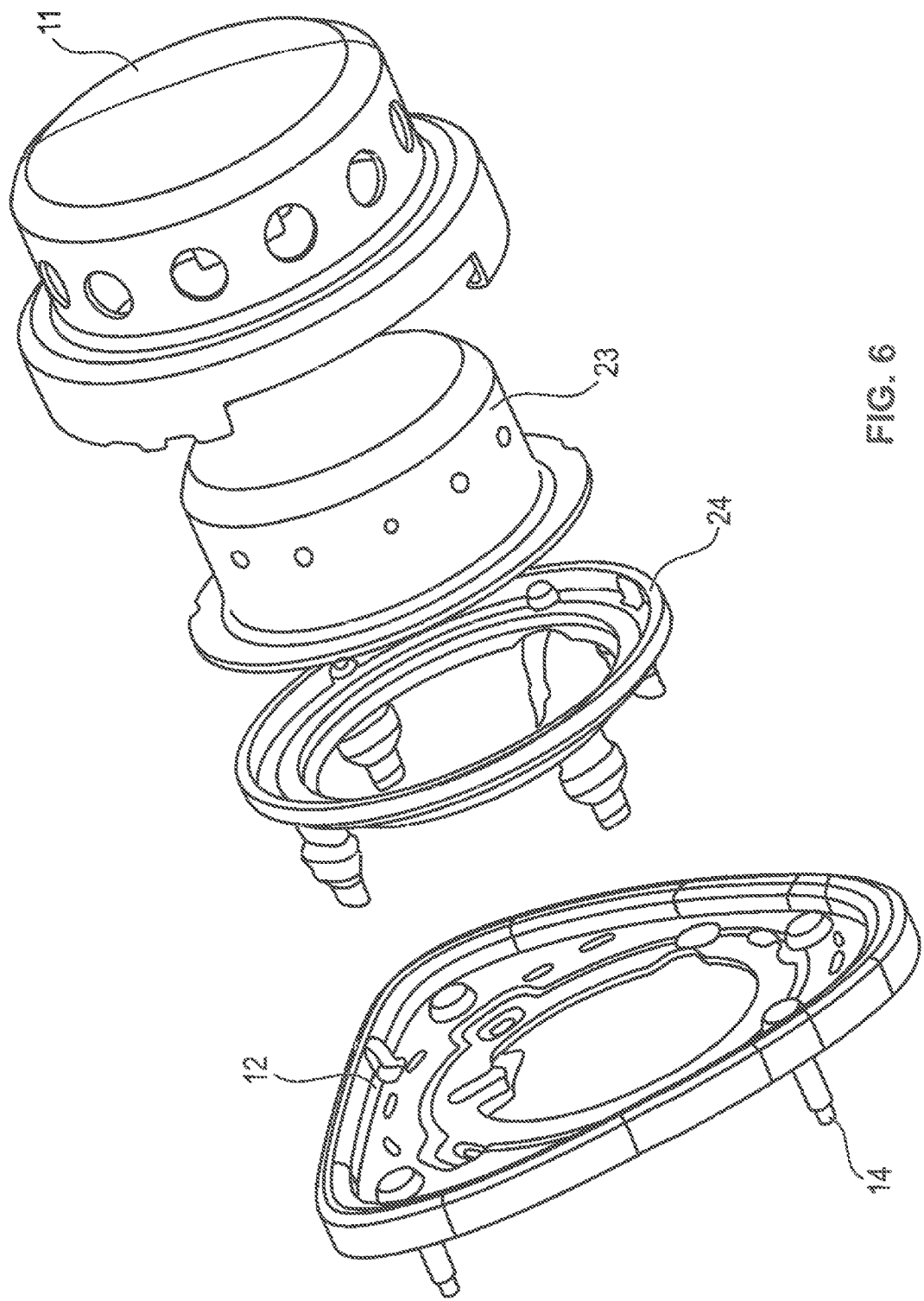
FIG. 6: shows a second schematic exploded view of the embodiment according to FIG. 5.

FIGS. 5 and 6 illustrate a schematic exploded view of components of another embodiment of the airbag module. In contrast to the embodiments according to FIGS. 1-4, in the embodiment according to FIGS. 5 and 6 the securing openings 13 as well as the dedicated securing bolts 14 are not arranged below the first part 11 or, resp., the dome section 11, but outside a projection of the first part 11 onto the plane in which the securing openings 13 are provided. The two-part design of the embodiments according to FIGS. 5-6 of the diffuser 10 corresponds to the two-part design of the embodiments according to FIGS. 1-4, however.

The second part 12 does not take a circular ring shape, however (as in the embodiment according to FIGS. 1-3 and also FIG. 4), but has an (approximately) triangular outer circumference, with the corners of the triangular outer circumference being rounded. A central opening 29 of the second part 12 takes a circular shape. In total the second part forms a ring.

The absorbing element shown in FIGS. 4-6 is made from elastic material, especially silicone. Reinforcing inserts (for example made from metal) may be provided.

In general, in all embodiments the second part 12 is arranged between the airbag (not shown) and the first part 11. The airbag thus is in (clamping) contact only with the second part 12 but not with the first part 11.

Basically, it is not excluded, however, that also the first part 11 (e.g. the tabs 15 thereof) is in contact with the airbag.

LIST OF REFERENCE NUMERALS 10 diffuser
11 first part, dome section
12 second part, retaining section
13 securing opening
14 securing bolt
15 tab
16 slit
17 seat
18 flow orifice
19 cylindrical section
20 tapering section
21 rim
22 underside
23 gas generator
24 absorbing element
24 absorbing foot
26 recess
27 opening
28 rim
29 opening

The invention claimed is:

1. A diffuser (10) for an airbag module for a safety system for vehicle passengers, wherein the airbag module comprises an airbag and a gas generator (23), wherein the diffuser (10) comprises a dome section (11) and at least one retaining section (12) which can secure the airbag in a compressed manner, wherein the retaining section (12) comprises at least one securing opening (13) in which at least one securing device (14) is received with each securing device (14) being arranged below the dome section (11) and inside a circumference of the gas generator (23).

2. The diffuser (10) according to claim 1, wherein the diffuser (10) is configured in at least two parts, wherein a first part (11) forms the dome section (11) and a second part (12) forms, at least in part, the retaining section (12).

3. The diffuser (10) according to claim 2, wherein a first material from which the first part (11) is fabricated and a second material from which the second part (12) is fabricated are different.

4. The diffuser (10) according to claim 2, wherein the first and second parts (11, 12) are one of positively and non-positively connected to each other.

5. The diffuser (10) according to claim 2, wherein at least one connecting means is provided for connecting the first and second parts (11, 12) to each other.

6. The diffuser (10) according to claim 2, wherein the diffuser (10) includes at least one securing tab (15) configured to penetrate a corresponding slit (16) inside the second part (12) for connecting the first and second parts (11, 12), each securing tab (15) extending to an underside (22) of the second part (12) and having a seat (17) for receiving each securing device (14).

7. The diffuser (10) according to claim 1, wherein the retaining section (12) has an annular section in which the at least one securing opening (13) is arranged.

8. The diffuser (10) according to claim 1, wherein the retaining section (12) includes an annular section with at least one opening (27) for receiving a damping member (25).

9. An airbag module for a safety system for vehicle passengers comprising the airbag, the gas generator (23) and the diffuser (10) according to claim 1.

10. The airbag module according to claim 9, further comprising one or more of the at least one securing device, an airbag housing, a module cap, and a module support.

11. The airbag module according to claim 9, further comprising an absorbing element (24).

12. The airbag module according to claim 11, wherein at least one section of the absorbing element (24) is arranged between the gas generator (23) and the retaining section (12).

13. The airbag module according to claim 9, wherein the retaining section (12) is arranged below the gas generator (23).

14. A safety system for vehicle passengers comprising the airbag module according to claim 9.

15. A safety system for vehicle passengers comprising the diffuser (10) according to claim 1.

16. The diffuser (10) according to claim 1, further comprising an annular absorbing element for receiving the gas generator and including circumferentially spaced apart damping members extending through openings in the retaining section for connecting the retaining section to the absorbing element.

17. A diffuser (10) for an airbag module for a safety system for vehicle passengers, wherein the airbag module comprises an airbag and a gas generator (23), wherein the diffuser (10) comprises a dome section (11) and at least one retaining section (12) which can secure the airbag in a compressed manner, wherein the retaining section (12) comprises at least one securing opening (13) in which at least one securing device (14) is received, wherein an annular absorbing element 24 receives the gas generator (23) and includes circumferentially spaced apart damping members (25) extending through openings (27) in the retaining section (12) for connecting the retaining section (12) to the absorbing element (24).

18. A diffuser for an airbag module for a safety system for vehicle passengers, wherein the airbag module comprises an airbag and a gas generator, the diffuser comprising:
- a dome section including securing tabs having seats; and
- a retaining section for securing the airbag in a compressed manner and including openings for receiving securing bolts, wherein the securing tabs extend through slits in the retaining section to an underside of the retaining section such that the securing bolts are received in the seats.

19. The diffuser according to claim 18, wherein the retaining section extends annularly about a centerline and the slits are positioned radially outward of the openings such that the seats extend radially inward to receive the securing bolts.

* * * * *